M. J. CALLAHAN.
THERMOSTATIC CONTROL FOR DAMPERS FOR UNIT VENTILATORS.
APPLICATION FILED MAY 13, 1920.
1,390,758.
Patented Sept. 13, 1921.
2 SHEETS—SHEET 2.
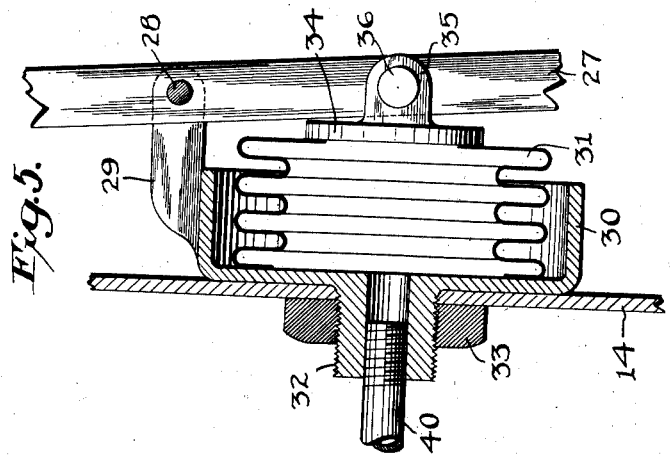
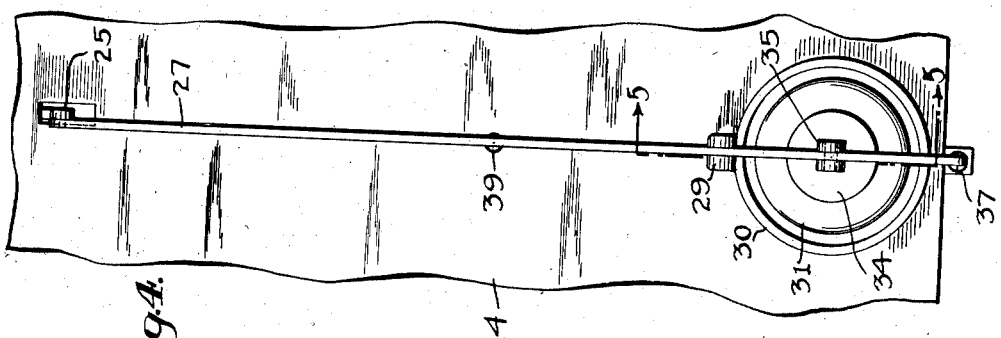
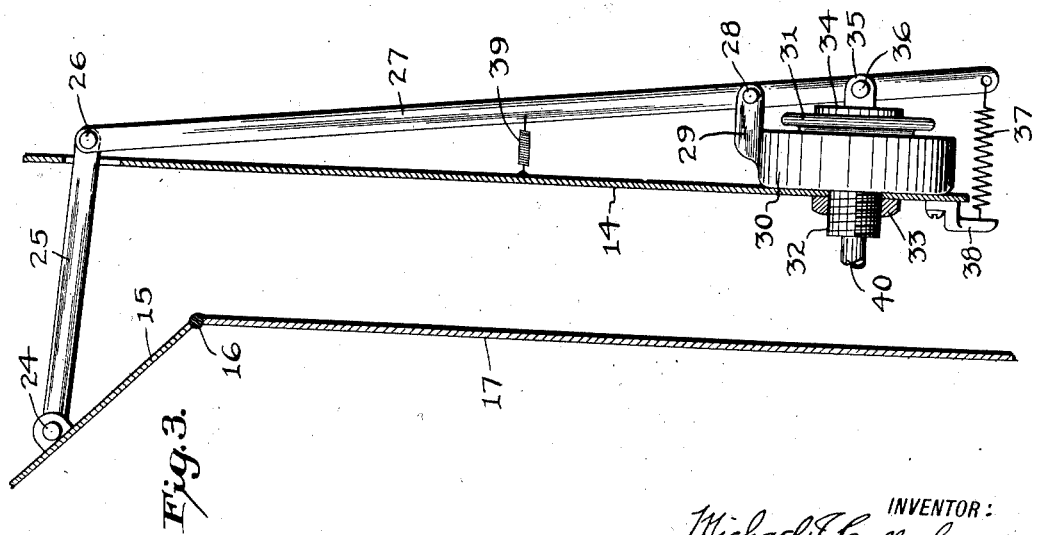
INVENTOR:
Michael J. Callahan,
BY
Chas. M. Chapman,
ATTORNEY.

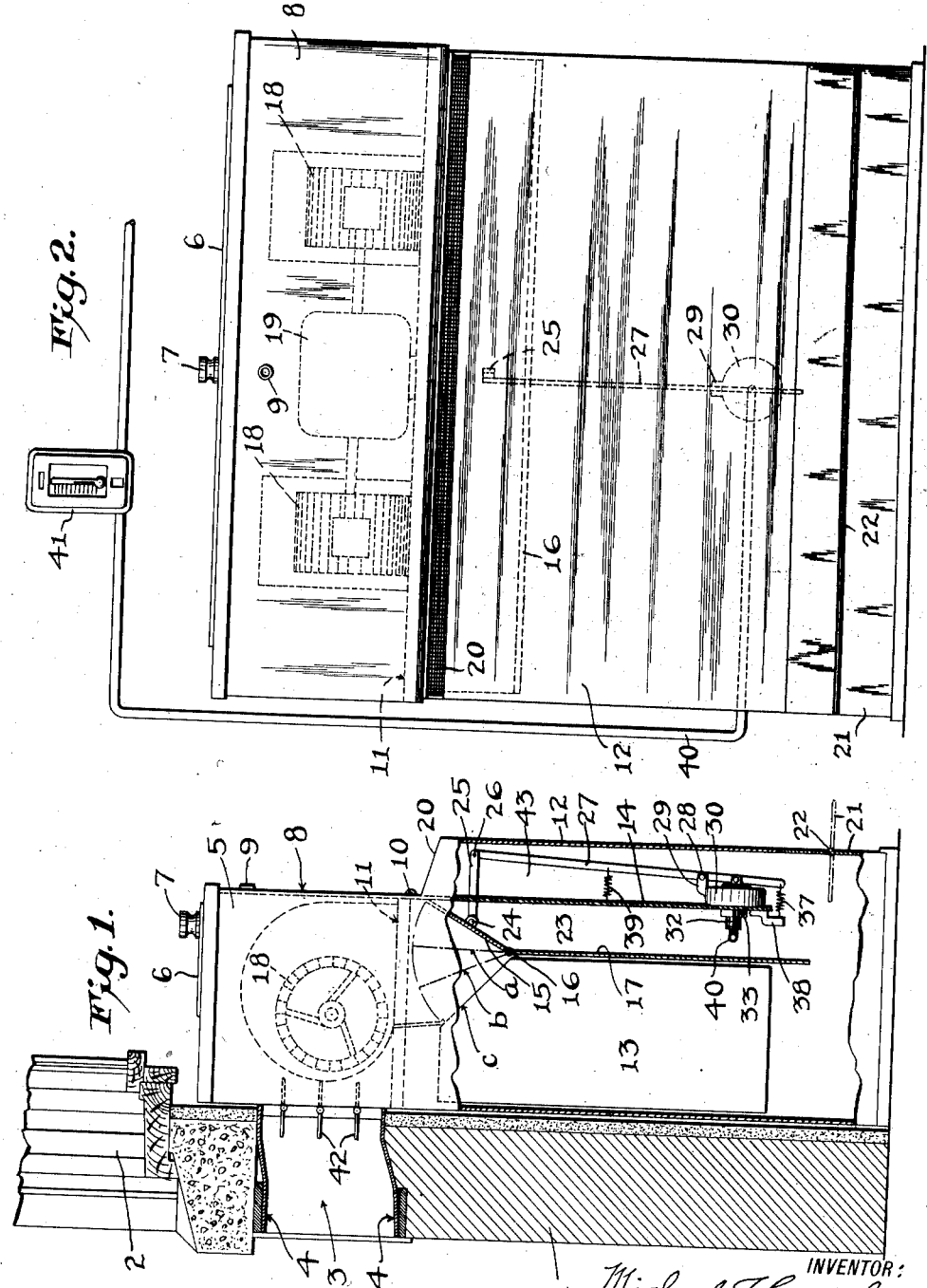

UNITED STATES PATENT OFFICE.

MICHAEL J. CALLAHAN, OF NEW YORK, N. Y.

THERMOSTATIC CONTROL FOR DAMPERS FOR UNIT VENTILATORS.

1,390,758.  Specification of Letters Patent.  Patented Sept. 13, 1921.

Application filed May 13, 1920. Serial No. 381,109.

*To all whom it may concern:*

Be it known that I, MICHAEL J. CALLAHAN, a citizen of the United States, residing in the borough of Manhattan, city, county, and State of New York, have invented a new and useful Improvement in Thermostatic Controls for Dampers for Unit Ventilators, of which the following is a description.

This invention has reference to ventilating apparatus of the unit type adapted for individual installation in schools, houses, lofts, basements, and buildings generally, as well as where the installation of the usual type of ventilating systems would be impracticable or too expensive, and, particularly, has reference to thermostatic control of the dampers for such unit ventilators, whereby the temperature of the air admitted to the room, or place where the ventilator is installed, may be regulated automatically as by the temperature in the room.

Among the objects of my invention may be noted the following: to provide a damper controlling means for unit ventilators by which the air driven through the apparatus into the room or space to be heated may be regulated as to temperature under the control of thermostatic conditions in the room; to provide a thermostatic control for dampers for unit ventilators which is simple, compact, efficacious and certain in operation, and through the medium of which the temperature of the air driven into the room by the fans or blowers can be regulated according to requirements; to provide a damper controlling mechanism for unit ventilators by means of which, automatically, the cold air admitted to the ventilator can be by-passed about the radiator; to provide a damper controlling mechanism for unit ventilators by means of which, automatically, the cold air admitted to the ventilator can be passed in regulated volume through the radiator or around the radiator, or both through and around the radiator; to provide means for regulating the damper for the purposes stated in the foregoing which is under thermostatic control, or control of the temperature of the room which is being supplied with air through the ventilator.

With the foregoing objects in view and others which will be detailed during the course of this description, my invention consists in the parts, features, elements and combinations thereof hereinafter described and claimed.

In order that my invention may be clearly understood, I have provided drawings wherein:

Figure 1 is a sectional elevation looking at the apparatus from one end embodying my invention, parts being broken away to show clearly the construction and mode of operation;

Fig. 2 is a front elevation of Fig. 1 showing a ventilating unit having a radiator therein and showing the position of my controlling means for the damper in dotted lines;

Fig. 3 is a sectional elevation of a detail on an enlarged scale showing the damper regulating means;

Fig. 4 is a top plan view of Fig. 3; and

Fig. 5 is an enlarged sectional detail showing the thermostatically operated controlling means.

Referring to the drawings, the numeral 1 indicates the wall of a building having an opening and surrounding framing for the opening, as usual, and generally indicated by 2. I desire it understood, however, that the passage 3 for the inlet of air to my ventilating unit may be through a window, the wall of a building, or through flues from any point or place where air can be obtained and which may be found most convenient, or suitable for the installation. Inserted in the opening 3 is the outwardly extended casing member 4 of the ventilating unit, the same being connected in any suitable manner with the casing 5, the top of which is provided with a hinged cover 6 adapted to be operated by the handle or knob 7. The front of the frame or casing, at its top, is provided with a closure 8 having a spring lock or other securing medium 9. The closure is hinged at its bottom, as at 10, adjacent the shelf or support 11, which divides the blower and motor space in the upper part of the casing from the lower part of the casing 12, wherein a radiator 13, baffle 14, and damper 15 are arranged, the damper 15 being pivotally mounted at 16 upon the partition 17 extending downwardly in front of the radiator 13. These parts, including the fans or blowers 18 and motor 19, are all the same as in my application Serial No. 301,190, filed June 2, 1919, and need not be described in further detail, since by themselves they form no part of my invention. The motor and blowers are supported upon the shelf 11.

The lower casing projects outwardly, and in its upper part is provided with the screen 20, through which the air is driven. The bottom of the lower casing is provided with a damper 21 pivoted at 22 to the casing and adapted to swing, as shown by dotted lines in Fig. 1, to open or close the space covered thereby. The damper 15 may be set in any one of the positions shown in Fig. 1, the full line position showing the damper closing the space 23 between the partition 17 and the baffle 14. The next progressive position indicated by *a* shows the damper shifted to substantially the vertical, thus admitting a small amount of fresh air into the space 23, but the major portion being directed through the radiator 13. The next progressive position is indicated at *b*, where the damper is so set as to shunt most of the air into the space 23 around the radiator, but permitting some of it to pass through the radiator. A further or extreme position is indicated at *c*, where the damper 15 will be at rest upon the inclined face of the radiator 13 and thus shunt all the fresh air, admitted at 3 and driven downwardly by the blowers, around the radiator and into the space 23. The operation of the damper 15 is through the mechanism shown in details in Fig. 5 under thermostatic control, as presently noted. Referring to Figs. 1, 3, 4 and 5, it will be seen that the damper 15 is pivotally connected at 24 to one end of a link 25, the opposite end of which is pivotally connected at 26 to the upper end of a lever 27, fulcrumed near its lower end at 28 to a lug or extension 29, carried by the casing member 30, which incloses the corrugated, resilient bellows 31, which helps control the operation of the lever 27. The casing 30 is provided with the screw-threaded, tubular nipple or extension 32, which extends through the lower end of the baffle 14 and which is held to said baffle by the nut 33 screwed upon the nipple 32. Thus the casing 30 is securely clamped in position. The bellows 31, as before stated, is corrugated and resilient, and is hermetically sealed to the inner wall of the casing 30, as well as to a disk 34 having the bifurcated lug 35 extended therefrom, to which is pivotally connected at 36 the lever 27. The lower end of the lever 27 has hooked to it the end of a spring 37, the opposite end of which is hooked to an angular bracket 38 secured to the lower end of the baffle 14 adjacent the casing 30. A spring 39 is hooked at one end to the lever 27 and, at its opposite end, to the baffle 14, the location of the spring 39 being at some point approximately midway between the casing 30 and pivotal point 26 of lever 27 with link 25. This should not be taken literally, since the function of the spring 39 is to aid in the return of the lever 27 to the position shown in Fig. 3, as the air enters, thus aiding the bellows in overcoming the tension of spring 37 and the weight and friction of the operating parts, plus the impact of the air driven by the blowers, down upon and against the damper 15, when the latter is being shifted from the position shown in Fig. 1. The tubular nipple 32 has its passage entering into the bellows 31 and tapped into said nipple is a supply pipe 40, Fig. 2, which extends to a source of fluid supply (compressed air) which is under control of the thermostatic device 41, which operates in the usual manner to pass and prevent the passage of the compressed air through the pipe 40, according to the thermostatic conditions of the room or chamber in which the thermostat is placed. Details of this construction need not be shown, since they are not of my invention and may be of any usual and well-known type.

Having thus described the details of my invention, the following mode of operation will be readily understood:

Any form of multiple damper 42, such, for example, as shown in my applications filed of even date herewith, may be mounted in the passage 3, to blower chamber in the casing 5, and such damper may be under control of my thermostatic, electrical, or other means. Air admitted to the blower chamber is driven downwardly through the shelf or support 11, and, if the damper 15 is in the full line position of Fig. 1, the said air will be driven entirely through the radiator 13 from whence, at its bottom, it will pass laterally and upwardly in the space 43, between the front of the casing 12 and the baffle 14, and will find its exit at the screened outlet 20. This mode of driving the air through the radiator causes the air to be thoroughly heated, and, when the air in the room becomes too warm, the thermostat 41 will operate to permit the passage of air through the pipe 40, which will enter the bellows 31, through the nipple 32 and thus expand the bellows. This will cause the bellows to operate the lever 27, which will be thrown outwardly, at its lower end, on its fulcrum 28, and inwardly at its upper end, thus causing the link 25 to shift the damper 15 to any one of the positions *a*, *b*, or *c*, or some intermediate position, according to the temperature of the room in which the ventilator is operating. Thus, under thermostatic control, automatically, and according to the temperature in the room where the ventilator is operating, the fresh air admitted at 3 may be caused to completely by-pass the radiator 13, or partially by-pass and partially go through it. This automatic control through the means noted has been found to be extremely efficacious, advantageous and desirable. The damper at 21 may be open or closed as desired, whereupon some of the air may pass through the opening while some of it may pass upwardly and find its way out at the screen 20. With the multiple damper 42 closed, and the damper 21 open, re-circulation in the room may be provided for. This, however, forms no part of my present invention, since it is all clearly set forth and claimed in my application Serial Number 301,190, filed June 2, 1919.

The apparatus, generally speaking, may be said to comprise a blower and motor chamber, a heating chamber below the blower and motor chamber, a by-pass chamber beside the heating chamber, and an outlet chamber. The baffle 14 separates the outlet chamber from the by-pass chamber, and the automatic means for operating the damper is, as before explained, mounted on the baffle, so that said means is located within the apparatus and specifically in the outlet chamber.

Having thus described my invention, what I claim and desire to secure by Letters Patent is:

1. A ventilating unit comprising an inclosing casing having a blower chamber provided with an inlet at its back and an outlet at its bottom, a heating chamber, and a by-pass chamber both below the blower chamber; a damper located at the entrance of the heating and by-pass chambers and below the blower chamber for directing the air from the blower chamber through either the heating or by-pass chamber; and automatic means within the casing for controlling the position of said damper.

2. A ventilating unit comprising an inclosing casing having a blower chamber provided with an inlet at its back and an outlet at its bottom, a heating chamber, and a by-pass chamber both below the blower chamber; and a damper located at the entrance of the heating and by-pass chambers and below the blower chamber for directing the air from the blower chamber through either the heating or by-pass chamber; and means within the casing for controlling the position of said damper, said means including a lever mechanism and fluid operated means for operating the same.

3. A ventilating unit comprising an inclosing casing having a blower chamber provided with an inlet at its back and an outlet at its bottom, a heating chamber, and a by-pass chamber both below the blower chamber; a damper located at the entrance of the heating and by-pass chambers and below the blower chamber for directing the air from the blower chamber through either the heating or by-pass chamber; automatic means within the casing for controlling the position of said damper, said means including fluid actuated devices; and thermostatic means for controlling the fluid-actuated devices.

4. A ventilating unit comprising an inclosing casing having a blower chamber provided with an inlet at its back and an outlet at its bottom, a heating chamber, and a by-pass chamber both below the blower chamber; a damper located at the entrance of the heating and by-pass chambers and below the blower chamber for directing the air from the blower chamber through either the heating or by-pass chamber; automatic means within the casing for controlling the position of said damper; and thermostatic means, for controlling the automatic means, operated by the temperature of the room in which the ventilating unit is operating.

5. A ventilating unit comprising an inclosing casing having a blower chamber provided with an inlet at its back and an outlet at its bottom, a heating chamber, and a by-pass chamber both below the blower chamber; a damper located at the entrance of the heating and by-pass chambers and below the blower chamber for directing the air from the blower chamber through either the heating or by-pass chamber; automatic means within the casing for controlling the position of said damper, said means including a fluid actuated device, and a lever mechanism connecting the fluid actuated device with the damper; and thermostatic means for controlling the action of the fluid actuated device.

6. A ventilating unit comprising an inclosing casing having a blower chamber provided with an inlet at its back and an outlet at its bottom; a heating chamber and a by-pass chamber both below the blower chamber; a damper located at the entrance of the heating chamber and by-pass chamber and below the blower chamber for directing the air from the blower chamber through either the heating or by-pass chamber; automatic means for controlling the position of the damper including a lever, a link connected to the lever at one end and to the damper at the other end; a spring connected to the lever at one end and to a fixture; a spring connected to the lever between its ends and to a fixture; a fluid controlled device connected to the lever between the two springs; and thermostatic means for controlling the passage of fluid to the said device.

7. A ventilating unit comprising an inclosing casing having a blower chamber provided with an inlet at its back and an outlet at its bottom; a heating chamber and a by-pass chamber below the blower chamber; a damper below the blower chamber for regulating the admission of air to the heating and by-pass chambers; fluid actuated means located within the casing for controlling the position of the damper; and thermostatic means located in the room where the apparatus is operating for controlling the action of the fluid means.

8. A ventilating unit comprising a casing having a blower and motor chamber, an inlet thereto, a heating chamber below the motor chamber, an outlet chamber, and a by-pass chamber between the heating and outlet chambers, in combination with a pivotally mounted damper for regulating the admission of air to the heating and by-pass chambers located at the entrance thereto, fluid means located in the outlet chamber and connections to the damper for actuating the latter, and thermostatic means located in the room where the apparatus is operating for controlling the action of the fluid means.

9. A ventilating unit comprising a blower and motor chamber, an inlet thereto, a chamber below the motor chamber divided by a vertical partition into a heating chamber and a by-pass chamber, in combination with a damper pivotally mounted at the top of the partition and adapted to swing relatively to the heating and by-pass chambers, and means located at the bottom of the by-pass chamber with connections to the damper for controlling the position of the latter, and thermostatic means located in the room where the appartus is operating for controlling the action of the damper-controlling means.

10. A ventilating unit capable of and adapted for installation in a room the temperature of which is to be controlled, comprising a blower, a heater, and a damper; a casing inclosing said elements and partitioned to provide an independent chamber for each of the blower, heater and damper, the blower chamber being above the heater chamber and the damper being arranged between the two said chambers and capable of closing one of them; automatic means within the casing and connected to the damper for actuating the latter; and means in the room of installation for controlling the operation of the damper-actuating means.

11. An apparatus for controlling the temperature of a room, consisting of a ventilating unit all the elements of which are installed in said room, and comprising a casing divided into a blower chamber, a heating chamber below the blower chamber, and an outlet chamber, and a by-pass chamber the latter being between the outlet and heating chambers; a damper mounted to swing between the heating and by-pass chambers and below the blower chamber; means within one of the chambers for actuating the damper; and controlling means for the actuating means located in the room where the apparatus is installed.

12. An apparatus for controlling the temperature of a room, consisting of a ventilating unit all the elements of which are installed in said room, and comprising a casing divided into a blower chamber, a heating chamber below the blower chamber, and an outlet chamber, and a by-pass chamber the latter being between the outlet and heating chambers; a damper mounted to swing between the heating and by-pass chambers and below the blower chamber; means within one of the chambers for actuating the damper; controlling means for the actuating means located in the room where the apparatus is installed, and means whereby the controlling means is operated by the temperature in the room of installation.

MICHAEL J. CALLAHAN.